(12) United States Patent
Carter et al.

(10) Patent No.: US 9,909,880 B2
(45) Date of Patent: Mar. 6, 2018

(54) AUTOMATED WAYFINDING OF AN ACCESSIBLE ROUTE

(71) Applicant: International Business Machines Corporation, Armonk, NY (US)

(72) Inventors: William S. Carter, Round Rock, TX (US); William A. Curtis-Davidson, Jr., Dunwoody, GA (US); John C. Hartley, Round Rock, TX (US); Sridhar Ramanan, Austin, TX (US); John C. Sanchez, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/935,884

(22) Filed: Nov. 9, 2015

(65) Prior Publication Data

US 2017/0131104 A1 May 11, 2017

(51) Int. Cl.
*G01C 21/34* (2006.01)
*G08G 1/123* (2006.01)
*G01C 21/20* (2006.01)
*G06T 11/20* (2006.01)

(52) U.S. Cl.
CPC ............ *G01C 21/20* (2013.01); *G01C 21/34* (2013.01); *G01C 21/3453* (2013.01); *G06T 11/206* (2013.01)

(58) Field of Classification Search
CPC .... G01C 21/34; G01C 21/3453; G06T 11/206

USPC ........................................................ 701/533
See application file for complete search history.

(56) References Cited

U.S. PATENT DOCUMENTS

| | | | |
|---|---|---|---|
| 6,401,030 B1 * | 6/2002 | Watanabe | G06Q 10/047 701/408 |
| 8,175,802 B2 | 5/2012 | Forstall et al. | |
| 8,594,935 B2 | 11/2013 | Cioffi et al. | |
| 8,886,462 B1 | 11/2014 | Cioffi et al. | |
| 9,037,400 B2 | 5/2015 | Tolstedt et al. | |
| 2009/0005965 A1 * | 1/2009 | Forstall | G01C 21/3484 701/533 |
| 2011/0238291 A1 * | 9/2011 | Bach | G01C 21/32 701/533 |
| 2015/0127256 A1 | 5/2015 | Cioffi et al. | |

FOREIGN PATENT DOCUMENTS

EP 2133663 12/2009

* cited by examiner

*Primary Examiner* — Maceeh Anwari
(74) *Attorney, Agent, or Firm* — Lieberman & Brandsdorfer, LLC (57) ABSTRACT

Embodiments of the invention relate to selecting a path for navigation based on path accessibility. A set of one or more paths is generated, with each path including path elements associated with path traversal. A list of preference data is stored. A set of accessible paths is dynamically calculated, which includes evaluating elements of each path of the generated set against the list of preference data. The set of accessible paths is converted into a path selection. The path selection is navigated, which includes visually displaying the path selection.

17 Claims, 8 Drawing Sheets

AUTOMATED WAYFINDING OF AN ACCESSIBLE ROUTE

BACKGROUND

The present invention relates to dynamic route navigation. More specifically, the invention relates to assigning attributes to aspects of a route, and dynamically calculating a route based on accessibility as defined by the attributes.

Navigation is a process of ascertaining a position, and planning and following a route to a destination. There are different categories of navigation, include non-real-time and real-time. Non-real time may employ the use of a conventional map or an electronic map, finding a route from a source location to a destination location, and following the route. In one embodiment, navigation may include a passenger providing direction instructions to a driver or operator to facilitate following the route. The real-time navigation takes place through use of a navigation tool, such as a GPS or an on-line mapping application. Regardless of the form, the real-time navigation detects a source location, receives a destination location, and provides a traversal route from the source to the target. The route selected by the navigation tool may consider traffic and select the route based on current traffic patterns at the time of route selection.

SUMMARY

The aspects described herein include a method, computer program product, and system for dynamic navigation of a route.

In one aspect, a method is provided to implement the dynamic route navigation. Two or more points of interest are modeled. This modeling includes representing each point of interest as a node in a graph, and a path between any two nodes as an edge in the graph. One or more node attributes are assigned to each node, with each node attribute associated with a characteristic of the node. In addition, one or more edge attributes are assigned to each edge, with each edge attribute associated with a characteristic of the edge. Both node and edge attributes are gathered, and a route is assessed for traversal of the graph based on the gathered attributes. More specifically, the assessed route is dynamically calculated, with the calculation accessibility of a traversal route through nodes and edges. In response to the dynamic calculation, the dynamically assessed route is converted into a route selection, and the selected route is navigated.

In another aspect, a computer program product is provided to implement the dynamic route navigation. The computer program product comprises a computer readable storage device having program code embodied therewith. The program code is executable by a processing unit to model two or more points of interest, including representing each point of interest as a node in a graph, and a path between any two nodes as an edge. The program code assigns one or more node attributes to each node and assigns one or more edge attributes to each edge. The program code gathers one or more assigned node attributes and edge attributes, and assesses a route for traversal of the graph based on the gathered attributes. In addition, the program code dynamically calculates the assessed route. The calculation takes into account accessibility of a traversal route through the nodes and edges. In response to the dynamic calculation, the program code converts the dynamically assessed route, including the nodes and edges, into a route selection for navigation.

In yet another aspect, a computer system is provided to implement the dynamic route navigation. The computer system is configured with a processing unit operatively coupled to memory. A tool is provided in communication with the processing unit to dynamically navigate a route. More specifically, the processing unit models two or more points of interest by representing each point of interest as a node in a graph, and a path between any two nodes as an edge. The processing unit assigns one or more node attributes to each node and assigns one or more edge attributes to each edge. The processing unit gathers one or more assigned node attributes and edge attributes, and assesses a route for traversal of the graph based on the gathered attributes. The processing unit dynamically calculates the assessed route. This calculation includes an assessment of accessibility of a traversal route through a plurality of the nodes and edges. In response to the dynamic calculation, the processing unit converts the dynamically assessed route, including the nodes and edges, into a route selection and navigation.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

When considering navigating a route or path from a source to a destination, there may be few possible routes available. It is often necessary to elimination all but one of the routes. The process of elimination is frequently based on the shortest distance from the source to the target. However, the shortest distance is not always optimal, depending on the situation. For example, a global positioning system or an online map may select a route that is longer but is free or relatively free of traffic, or the selected route may be one that avoids toll roads. There are a variety of factors that are known for use in route assessment and/or selection.

Route selection and navigation is not limited to land vehicles and associated roads. For example, route selection and navigation may be applied to an indoor venue. Regardless of the venue, outdoor across roadways or indoors within the confines of a venue, the route selection needs to be modified to account for and take into consideration criteria associated with the subject that will be traversing the selected route. More specifically, the subject may have needs that require accommodation with respect to traversal of the route. The needs may be general, such as categories of landmarks along the way that are parameters of the route traversal, or specific needs, such as an indoor venue that is wheelchair accessible. For example, if the subject is blind and has a service animal, the subject may need a route that has a relief area for the service animal. If the subject is confined to a wheelchair, the subject will need a route that is free of obstacles, such as stairs, escalators, etc. Criteria associated with the needs of the subject are incorporated into the route selection and navigation tool and process, so that the selected route accommodates the subject. In one embodiment, the tool and process select the best route based on the needs of the parameters set by the subject.

Figure 1:
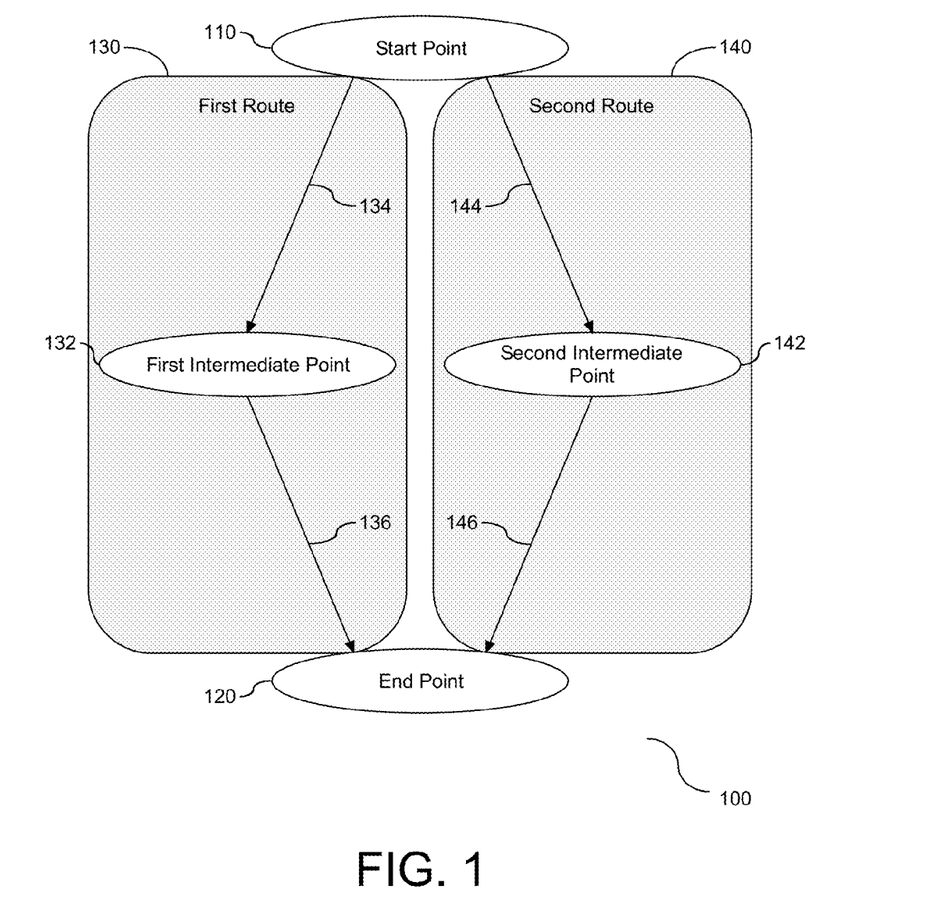
FIG. 1 depicts a block diagram illustrating basic components of a route to be navigated.

A route is defined with a start location and an end location. With reference to FIG. 1, a block diagram (100) is provided illustrating basic components of a route to be navigated. In one embodiment, the route includes two or more points of interest, including the start location and the end location. Beyond these two points, a point of interest may be, for example, a turning point, an obstacle, or any point along the route that may affect the course of travel. Each point of interest is defined as a node, and a path between two adjacent nodes is defined as a segment or edge of the graph. That is, a segment represents a mode of traversal between consecutive or adjacently positioned nodes in the graph. For example, a segment may be a walkway, a road, a stairway, a sidewalk, a fire pole, an elevator, an escalator, a train, a bus, etc.

As shown in the example diagram, the start point (110) is a point of interest. Similarly, the end point (120) is another point of interest. There are two optional routes provided in this example diagram, with both routes having the same start and end points (110) and (120) respectively. A first route (130) has a first intermediate point of interest (132), and a second route (140) has a second intermediate point of interest (142). The first route has two segments (134) and (136), with the first segment (134) extending from the start point (110) to the first intermediate point of interest (132) and the second segment (136) extending from the first intermediate point of interest (132) to the end point (120). Similarly, the second route (140) has two segments (144) and (146), with the first segment (144) extending from the start point (110) to the second intermediate point of interest (142), and the second segment (146) extending from the second intermediate point of interest (142) to the end point (120). Accordingly, each route has at least two points of interest, i.e. the start point and the end point, represented as nodes and at least one segment, represented as an edge, to connect the at least two nodes.

Each node and segment is associated with one or more defining characteristics. Examples of these characteristics include, but are not limited to, physical characteristics and accessibility characteristics. Attributes selected by the subject with respect to defining the route to be navigated are assessed and compared with the defined characteristics of each node and segment to ascertain the ranking or even viability of the route for the subject.

Figure 2A:
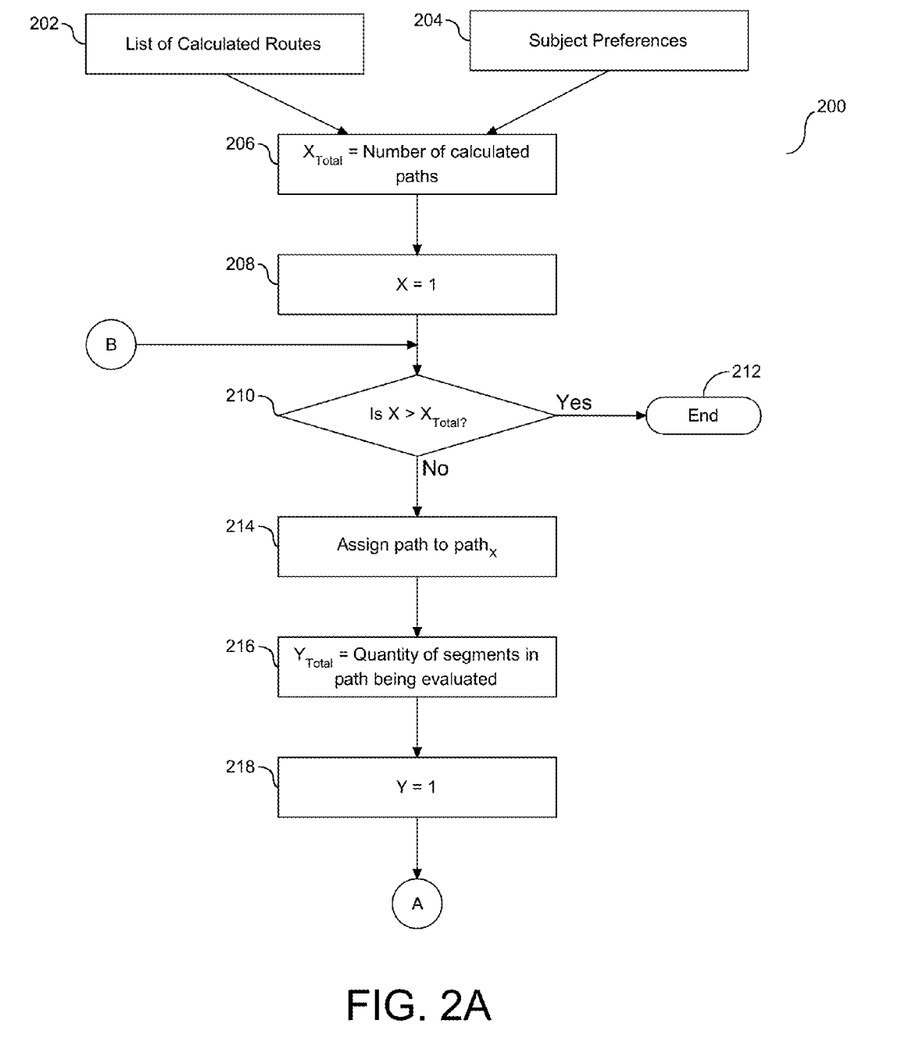
FIGS. 2A and 2B depict a flow chart illustrating a process for dynamically calculating accessibility of nodes and segments for path selection.
Figure 2B:
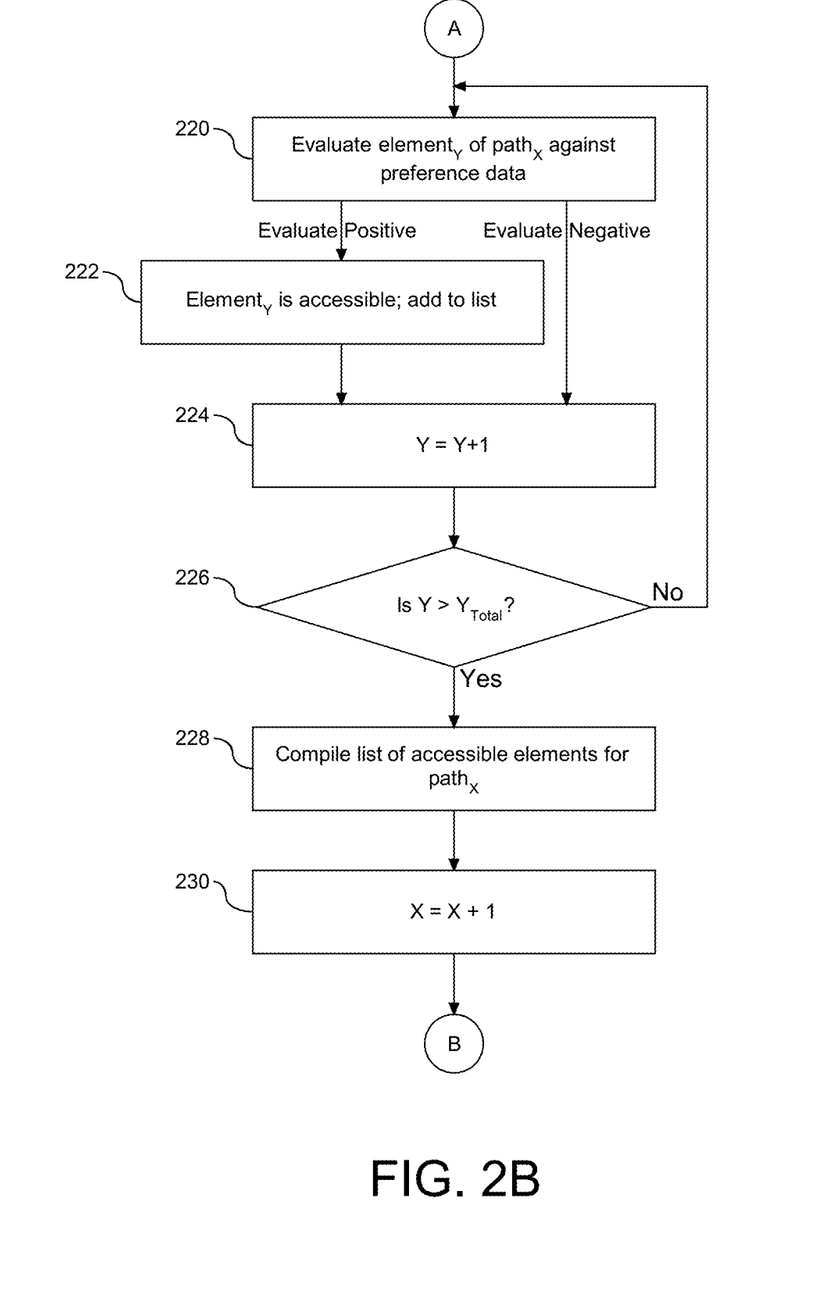

Referring to FIGS. 2A and 2B, a flow chart (200) is provided illustrating a process for dynamically calculating accessibility of nodes and segments for path selection. There are two input values in this process, including a list of calculated routes (202), and subject preferences (204). Tools for calculating routes, also referred to herein as paths, are known in the art and are hereby incorporated by reference. In one embodiment, the process of generating the set of paths received as input including performing an iteration to determine all the possible paths from the start point to the end point, which are then accumulated into the set. For example, beginning at the start point, each possible traversal decision from a current node to a subsequent node may be determined by evaluating each of the possible edges connecting the current node to the subsequent node. Each path of the generated set includes path elements associated with path traversal.

The path elements may include two or more points of interest modeled as nodes of a graph, and one or more segments connecting any two points of interest modeled as edges of the graph. In one embodiment, generating the set of paths further includes assigning one or attributes to each node and one or more edge attributes to each edge. Accordingly, each node attribute is associated with a characteristic of a respective node and each edge attribute is associated with a characteristic of a respective edge.

A route may be subject to elimination based on personal preferences of restrictions. To implement these preferences and/or restrictions, a list of preference data is provided as input at (204). The preference data may be unique to a particular subject, or may be a collection of generalized preference data associated with a class of subjects. In one embodiment, the preference data includes at least one set of preference values. These preference values may be represented as a preference verb associated with a corresponding attribute. A preference verb may be associated with a restriction corresponding to the attribute, such as rejection of the attribute or a requirement corresponding to the attribute. The manner in which subject preference data is entered or otherwise input is not the subject of dynamic calculation as described herein. Accordingly, the preference data may include data associated with path travel requirements and data associated with path travel preferences.

For example, if a subject is in a wheelchair, the subject may prefer or require that a path not have segments that are not wheelchair accessible. Preference data for this subject may include, for example, data associated with rejecting or avoiding the use of stair or escalators. If a subject is blind, the subject may prefer or require a route having a node to support travel. Preference data for this subject may include, for example, preference for an area that provides service animal relief. Accordingly, the preference data input at step (204) may be configured to reflect preferences and/or requirements with respect to a particular subject or a general class of subject.

Each user may have a unique set of preferences, also referred to herein as attributes. The manner in which the user enters or otherwise submits their set of preferences is not the subject of the path accessibility evaluation. At a minimum there is a single path that has been made available to the subject. The variable $X_{Total}$ represents the number of calculated paths (206), as determined from the generated path list, and an associated counting variable X is initialized (208). Accordingly, the first part of the dynamic accessibility calculation and evaluation pertains to the quantity of paths and the preferences of the subject.

Following initialization of the path counting variable at step (208), it is determined if the path counting variable is greater than the set of calculated paths (210). A positive response to the determination at step (210) concludes the path evaluation process (212). However, an affirmative response to the determination at step (210) is followed by assigning the path to the current path in the path list (214), $path_X$, to ensure that each path is properly evaluated. Accordingly, the first part of the accessibility calculation and evaluation pertains to the quantity of paths and the preferences of the subject.

The path evaluation may take place in series, with each path sequentially subject to evaluation, or in one embodiment, the evaluation may take place parallel, with each path subject to evaluation at the same time. In the example shown herein and demonstrated in detail, the evaluation process is performed serially. The variable $Y_{Total}$ is assigned to the quantity of nodes and segments, referred to herein collectively as segments, in the path being evaluated (216), $path_X$, and an associated segment counting variable, Y, is initialized (218). $Element_Y$ of $path_X$ is evaluated against the subject preference data to determine path accessibility (220). In one embodiment, the evaluation at step (220) includes comparing the node or edge attributes of the path against the at least one set of preference values. Details of the process of evaluating a node or segment against the defined criteria of the preference lists is shown and described in FIGS. 3A and 3B below. Accordingly, for each path, a set of nodes and segments are defined therein, with each node and segment in the path subject to evaluation for accessibility.

An affirmative response to the determination at step (220) is followed by defining $element_Y$ as accessible based on the evaluation and adding element to a list of accessible elements (222). Similarly, an $element_Y$ defined as inaccessible based on the evaluation at step (220) is not added to the list of accessible elements, and in one embodiment is placed in a list of inaccessible elements. Following either step (222) or a negative determination to the evaluation at step (220), the element counting variable is incremented (224). It is then determined if each of the nodes and segments in the path subject to evaluation have been evaluated for accessibility (226), i.e. is $Y > Y_{Total}$. A non-affirmative response to the determination at step (226) is followed by a return to step (220) for evaluation of the next element in the path. However, an affirmative response to the determination at step (226) is an indication that the path evaluation process for the path being evaluated is completed, and that the path has been determined to be an accessible path, and therefor a viable candidate as a potential path for navigation by the subject. As shown herein, each accessible $element_Y$ for the subject path is added to a list of accessible paths for navigation (228).

Following step (228), the path counting variable, X, is incremented (230), followed by a return to step (210) to continue the evaluation of paths in the list of paths. More specifically, the process of path evaluation takes places for each path in the path list, and specifically, for each node and edge in each path in the path list. As shown herein, an accessible path is a path in which all of the edges and nodes in the path have been subject to evaluation against defined criteria, as delineated in the preference list.

As discussed, preference data may be embodied in a list of preference values. In one embodiment, one or more sets of preference values are comprised in the list of preference values. The list of preference values may be referred to as a preference specification. The preference specification is stored for use in the dynamic accessibility calculation of FIGS. 2A and 2B. Each set of preference values may be associated with a category, and each preference value may be represented as a preference verb joined with an attribute corresponding to the category. As discussed above, the preference verb establishes a preference relationship with respect to the attribute. Preference verbs may include, but are not limited to, "rejects," "requires," and "prefers." For example, a generalized preference specification may include a set of preference values associated with a category called "vision impaired." In the "vision impaired" preference specification, there may be one or more preference values, which may include "prefers large fonts" and "rejects not screen reader compatible." A preference specification may be created for a particular subject as well, thereby allowing for a preference specification tailored to the preferences of the particular subject.

As discussed above, a set of paths may be generated that includes every possible path between a start point and an end point. Each path includes points of interests and segments connecting the points of interest, which may be represented in a graph form as nodes and edges, respectively. In one embodiment, each node and edge of a generated path may be assigned with respective attributes. Each attribute defines a characteristic of the nodes and edges. For example, the attributes may include a name of the node or segment, a capability of the node or segment, a physical characteristic of the node or segment (e.g., physical measurements), a direct accessibility characteristic (e.g., not wheelchair accessible), etc. For example, for a "vending machine" node, attributes that may be assigned to the vending machine node may include "vending machine," "accepts paper bills," "buttons are not marked with Braille," "is not voice operated," etc. Accordingly, the assigned attributes describe various aspects of a node or element.

Figure 3A:
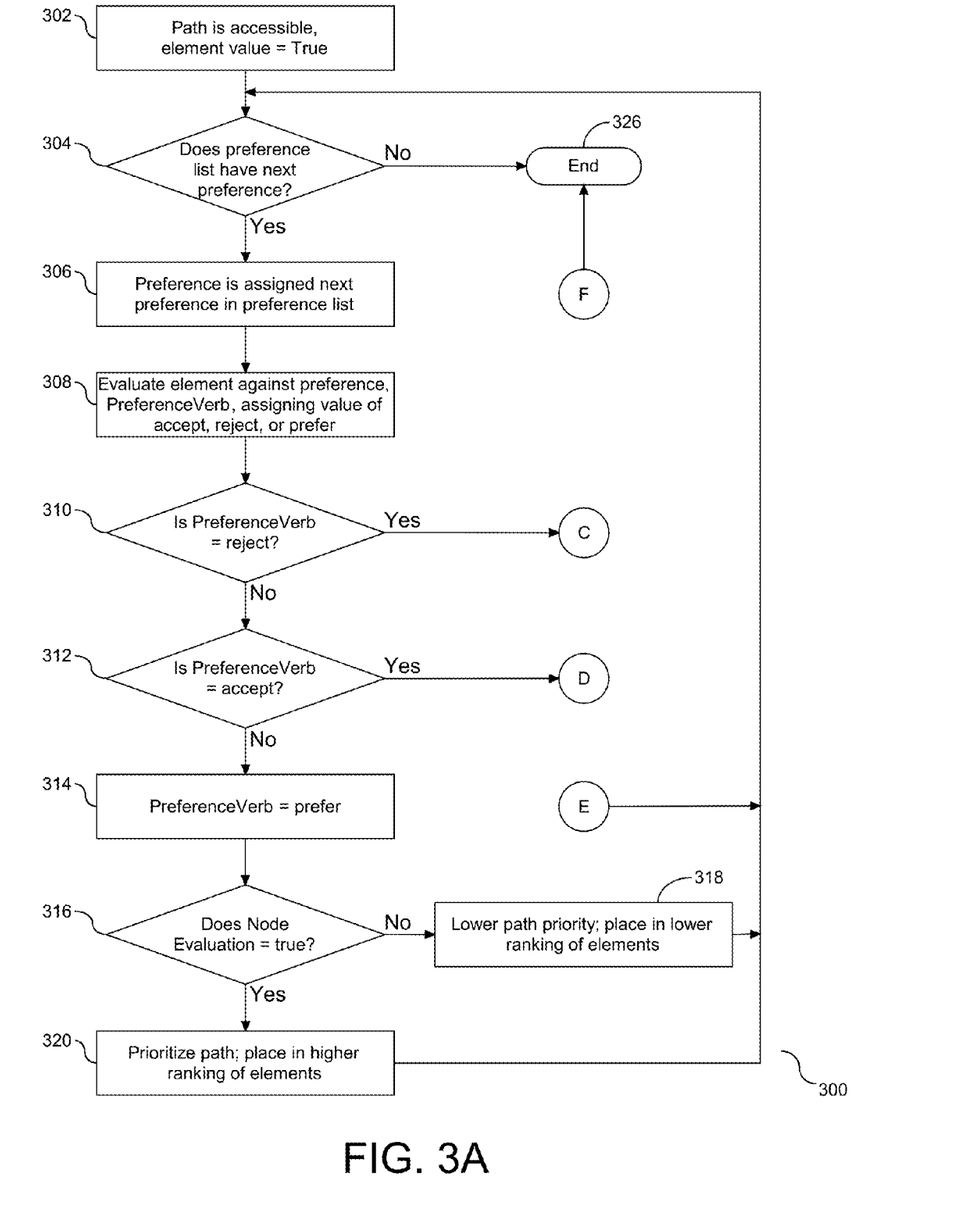
FIGS. 3A and 3B depict a flow chart illustrating a process for evaluating each node or segment of a path (i.e., element) against preference value data.
Figure 3B:
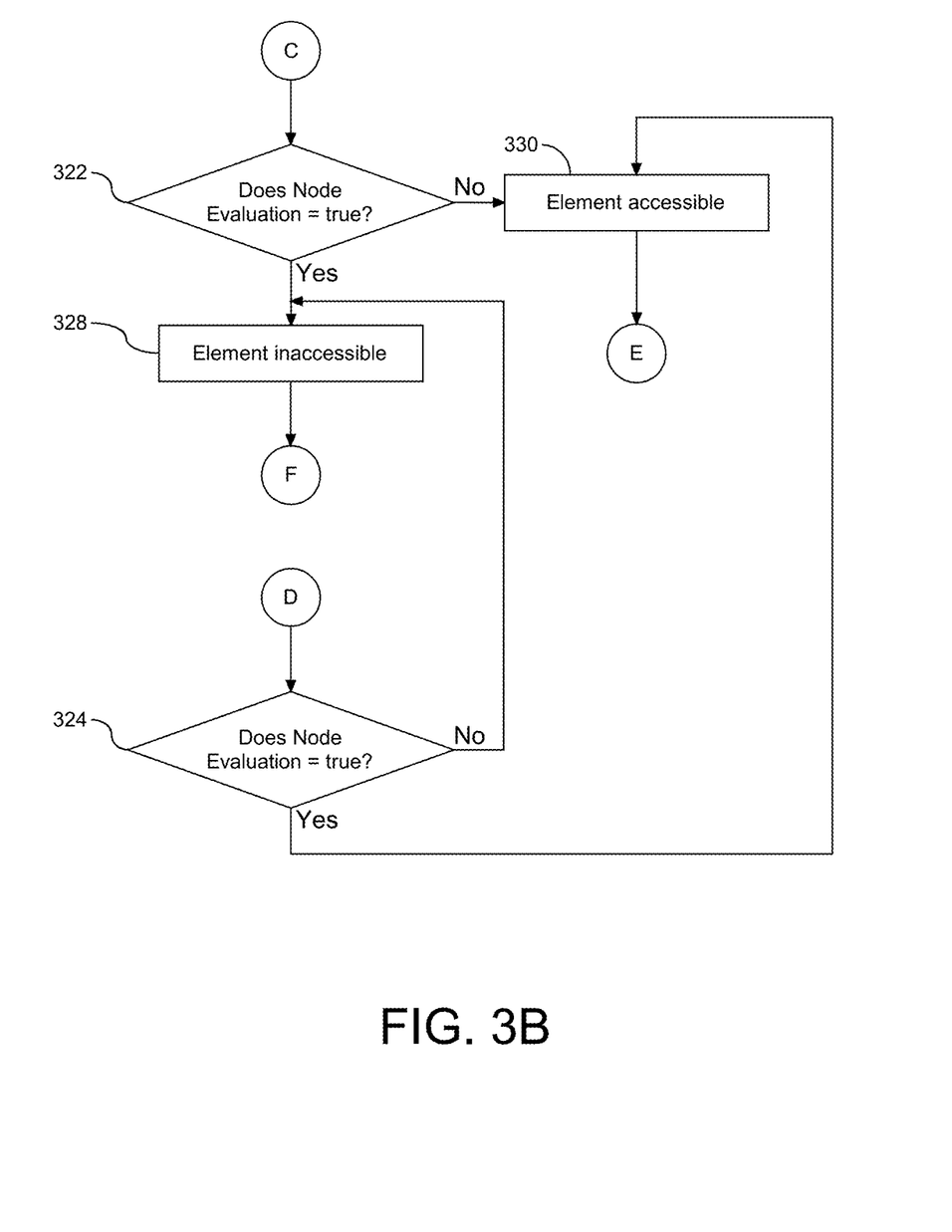

Referring now to FIGS. 3A and 3B, a flow chart (300) is provided illustrating a process for evaluating each node or segment of a path (i.e., element) against preference value data. It is understood that each element may have an associated preference value identifying each element as acceptable, to be rejected, or preferred. Initially, the element value is set to true (302), indicating that the element, point of interest or segment is accessible. It is then determined if the preference list has a next preference (304). A negative response to the determination at step (304) ends the process of checking the element against associated preference value (326), indicating that the element is accessible. However, a positive response to the determination at step (304) is followed by assigning the variable preference to the next preference in the preference list (306).

The element is then evaluated against this next preference (308). Following the next evaluation, the preference verbs for the element are evaluated. In one embodiment, there are three values for the preference verbs, including accept, reject, or prefer. Each of these values is subject to evaluation. More specifically, following step (308), it is determined if the associated preference verb for the preference value is set to reject (310). A negative response to this determination is following by assessing if the preference verb is set to accept (312). If the response to the determination at step (312) is negative, the preference value for the element is determined to be set to prefer (314). Thereafter, the elements are subject to prioritization. Specifically, following step (314), it is determined if the element evaluation is set to true (316). A negative response to the determination at step (316) is an indication that the element is not ranked high among prioritized elements, and as such, the path associated with the element is placed in a lower ranking of the elements (318). However, a positive response to the determination at step (316) is following by raising the position of the element evaluation in among a higher position in the ranking of the elements (320). Following step (318) or (320), the process returns to step (304) to assess if there is another element in the path, such as a segment or point of interest that requires evaluation.

For each of the preference evaluations at steps (310) and (312), there is further assessing. As demonstrated by a positive response to the determination at step (310), it is then determined if the element evaluation is set to true (322). A negative response to the determination at step (322) is an indication that the element is accessible (330), followed by a return to step (304), and a positive response to the determination at step (322) is an indication that the element is inaccessible (328), and a conclusion of the element evaluation (326). Similarly, a positive response to the determination at step (312) is following by determining if the node evaluation is set to true (324). As shown, a positive response at (324) is followed by a return to step (330) as an indication that the element is accessible, and a negative response at (324) is followed by a return to step (328) as an indication that the element is inaccessible. The order of the preference value evaluation is not limiting, and the process shown herein is merely one embodiment for evaluation. Accordingly, as shown herein, each element in the path is subject to evaluation and or prioritization for formation of accessible or inaccessible paths, and for those paths that are accessible, a prioritization of the elements within the accessible paths.

Figure 4:
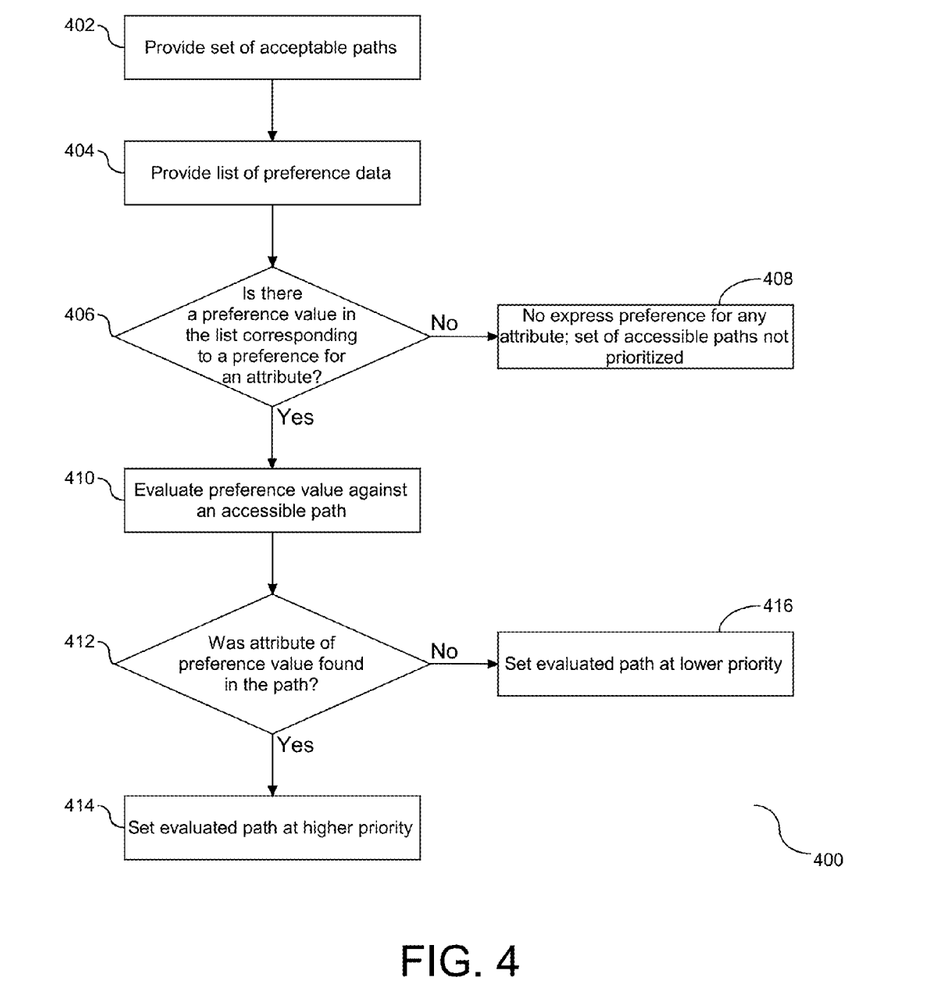
FIG. 4 depicts a flow chart illustrating prioritization of accessible paths.

A potential preference value may correspond to a preference for a particular attribute. Attribute preferences may be used to further refine a set of accessible paths for selection. With reference to FIG. 4, a flow chart is provided illustrating prioritization of accessible paths. A set of accessible paths is provided (402), and a list of preference data is provided (404). In one embodiment, the list of preference data includes one or more preference values corresponding to a preference verb and an associated attribute. It is determined if there is a preference value in the list corresponding to a preference for an attribute (406). A non-affirmative response to the determination at step (406) means that there is no express preference for any attribute, and the set of accessible paths is not prioritized (408). An affirmative response to the determination at step (406) indicates an express preference for a particular attribute. The preference value is evaluated against an accessible path of the set (410), and it is determined if the attribute of the preference value is found within the path (412). In one embodiment, the evaluation at step (410) includes comparing the attribute of the preference value to the attributes of the elements of the path being evaluated. An affirmative response to the determination at step (412) indicates that the evaluated path is more preferable, and the evaluated path is placed at a higher priority in the set (414). In one embodiment, step (414) includes placing the path in the front of the set. A non-affirmative response to the determination at step (412) indicates that the evaluated path is less preferable, and the evaluated path is placed at a lower priority in the set (416). In one embodiment, step (416) includes placing the path at the end of the set.

Figure 5:
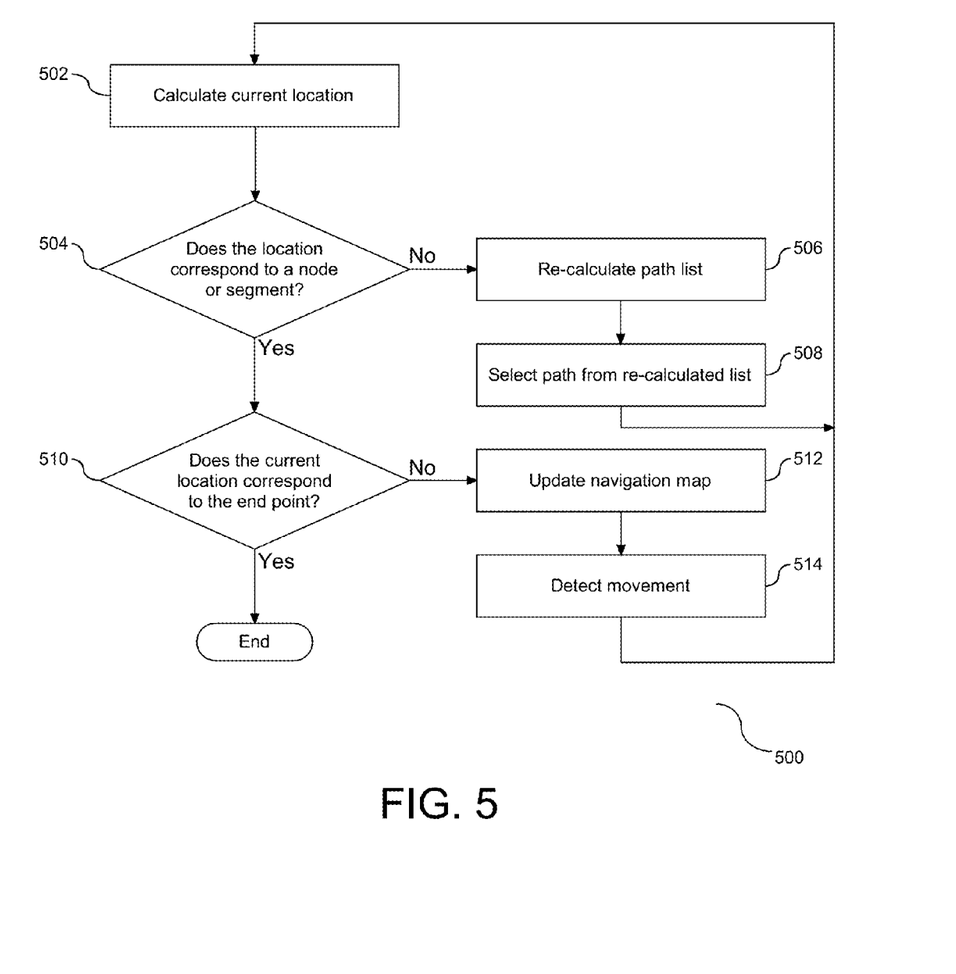
FIG. 5 depicts a flow chart illustrating a process for dynamically re-calculating a path list while traversing a current path.

Referring now to FIG. 5, a flow chart (500) is provided illustrating a process for dynamically re-calculating a path list while traversing a current path. A current location is calculated (502). It is determined if the current location corresponds to a node or segment of the path (504). A non-affirmative response to the determination at step (504) causes a re-calculation of the accessible path list (506). A path is selected from the re-calculated path list (508), and the process reverts back to step (502). An affirmative response to the determination at step (504) indicates that the current position is at a node or segment. It is determined if the current location corresponds to the end point of the path (510). An affirmative response to the determination at step (510) signifies arrival at the destination, and the process ends. A non-affirmative response to the determination at step (506) means that the path is still being traversed. A navigation map displaying the current position in relation to the path is updated (512). In response to detecting movement from the current position (514), the process reverts back to step (502). Accordingly, a current location is dynamically calculated, which is used to re-calculate an accessible path list and update a navigation map.

Figure 6:
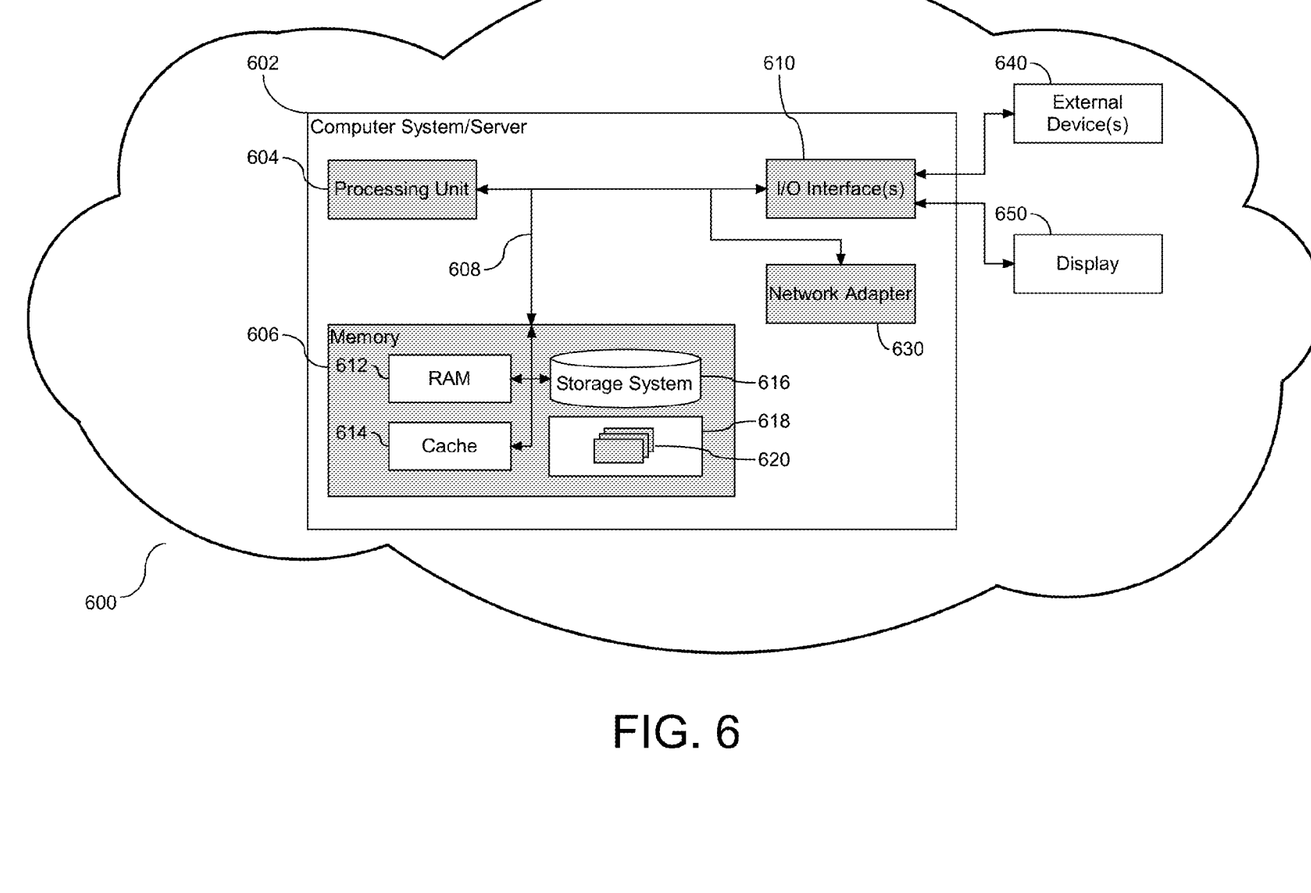
FIG. 6 depicts a block diagram illustrating an example of a computer system for performing the embodiments described above with respect to FIGS. 2A-5.

With reference to FIG. 6, a block diagram (600) is provided illustrating an example of a computer system (602), hereinafter referred to as a host (602), for performing the embodiments described above with respect to FIGS. 2-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and filesystems (e.g., distributed storage environments and distributed cloud computing environments) that include any of the above systems or devices, and the like.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, host (602) is shown in the form of a general-purpose computing device. The components of host (602) may include, but are not limited to, one or more processors or processing units (604), a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (612) and/or cache memory (614). Host (602) further includes other removable/non-removable, volatile/non-volatile computer system storage media. By way of example only, storage system (616) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces. As will be further depicted and described below, memory (606) may include at least one program product having a set (e.g., at least one) of program modules that are configured to carry out the functions of the embodiments described above with reference to FIGS. 1-5.

Program/utility (618), having a set (at least one) of program modules (620), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (620) generally carry out the functions and/or methodologies of embodiments as described herein. For example, the set of program modules (620) may be implemented as a tool configured to perform the embodiments described above with reference to FIGS. 2-5.

Host (602) may also communicate with one or more external devices (640), such as a keyboard, a pointing device, etc.; a display (650); one or more devices that enable a user to interact with host (602); and/or any devices (e.g., network card, modem, etc.) that enable host (602) to communicate with one or more other computing devices. In one embodiment, the display (650) visually displays a path selection during navigation of the path selection. Such communication can occur via Input/Output (I/O) interface(s) (610). Still yet, host (602) can communicate with one or more networks such as a local area network (LAN), a general wide area network (WAN), and/or a public network (e.g., the Internet) via network adapter (630). As depicted, network adapter (630) communicates with the other components of host (602) via bus (608). In one embodiment, a filesystem, such as a distributed storage system, may be in communication with the host (602) via the I/O interface (610) or via the network adapter (630). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

The aspects described herein may be embodied as a system, a method, and/or a computer program product. The computer program product may include a computer readable storage medium (or media) having computer readable program instructions thereon for causing a processor to carry out aspects of the present invention.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The corresponding structures, materials, acts, and equivalents of all means or step plus function elements in the claims below are intended to include any structure, material, or act for performing the function in combination with other claimed elements as specifically claimed. The description of the embodiments herein has been presented for purposes of illustration and description, but is not intended to be exhaustive or limited to the embodiments in the forms disclosed. Many modifications and variations will be apparent to those of ordinary skill in the art without departing from the scope and spirit of the embodiments described herein. The embodiments were chosen and described in order to best explain the principles and the practical application, and to enable others of ordinary skill in the art to understand the various embodiments with various modifications as are suited to the particular use contemplated.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

We claim:

1. A method for dynamic route navigation comprising:
dynamically generating, by a processor, an electronic map having a plurality of elements, the elements including at least four nodes, each node corresponding to a point of interest, and at least three edges, each edge corresponding to a path between any two nodes;
assigning two or more attributes to each element, wherein each attribute is associated with a characteristic of the element, the characteristic selected from the group consisting of: a physical characteristic, and an accessibility characteristic;
dynamically assessing an accessible route for traversal by a navigating entity utilizing the electronic map including:
comparing, by the processor, a first assigned attribute of the two or more assigned attributes to one or more first accessibility criteria associated with the navigating entity, each first accessibility criteria associated with a first preference value, the first preference value selected from the group consisting of: a rejection of the associated first accessibility criteria and a requirement for the associated first accessibility criteria;
identifying, by the processor, at least four elements as navigable based on the comparison;
ranking each of the identified at least four navigable elements based on comparing, by the processor, a second assigned attribute of the two or more assigned attributes to one or more second accessibility criteria associated with the navigating entity, each second accessibility criteria associated with a second preference value, the second preference value is a priority for the associated second accessibility criteria; and
identifying, by the processor, at least three of the at least four navigable elements as preferable based on the ranking, the at least three preferable elements including at least two nodes and at least one path; and
converting the dynamically assessed accessible route, including the identified at least three preferable elements, into a route selection; and
navigating, by the processor, the selected route.

2. The method of claim 1, further comprising calculating a current location during traversal of the selected route, and dynamically re-assessing the selected route during traversal, including evaluating an encountered node in the selected route against the assigned two or more attributes.

3. The method of claim 2, wherein the dynamic re-assessment validates passage through the encountered node.

4. The method of claim 1, further comprising calculating a current location during traversal of the selected route, and dynamically re-assessing the selected route during traversal, including evaluating an encountered edge in the route against the assigned two or more attributes.

5. The method of claim 4, wherein the dynamic re-assessment validates passage through the encountered edge.

6. The method of claim 1, wherein dynamically assessing the accessible route includes evaluating at least one of the elements against category criteria assigned to each element.

7. A computer program product for dynamic route navigation, the computer program product comprising a non-transitory computer readable storage medium having program code embodied therewith, the program code executable by a processing unit to:
dynamically generate an electronic map having a plurality of elements, the elements include at least four or more nodes, each node corresponding to a point of interest, and at least three edges, each edge corresponding to a path between any two nodes;
assign two or more attributes to each element, wherein each attribute is associated with a characteristic of the element, the characteristic selected from the group consisting of: a physical characteristic, and an accessibility characteristic;
dynamically assess an accessible route for traversal by a navigating entity utilizing the electronic map including;
compare a first assigned attribute of the two or more assigned attributes to one or more first accessibility criteria associated with the navigating entity, each first accessibility criteria associated with a first preference value, the first preference value selected from the group consisting of: a rejection of the associated first accessibility criteria and a requirement for the associated first accessibility criteria;
identify at least four elements as navigable based on the comparison;
rank each of the identified at least four navigable elements based on a comparison of a second assigned attribute of the two or more assigned attributes to one or more second accessibility criteria associated with the navigating entity, each second accessibility criteria associated with a second preference value, the second preference value is a priority for the associated second accessibility criteria; and
identify at least three of the at least four navigable elements as preferable based on the ranking, the at least three preferable elements including at least two nodes and at least one path; and
convert the dynamically assessed accessible route, including the identified at least three preferable elements, into a route selection; and
navigate the selected route.

8. The computer program product of claim 7, further comprising program code to calculate a current location during traversal of the selected route, and dynamically re-assessing the selected route during traversal, including evaluating an encountered node in the selected route against the assigned two or more attributes.

9. The computer program product of claim 8, wherein the dynamic re-assessment validates passage through the encountered node.

10. The computer program product of claim 7, further comprising program code to calculate a current location during traversal of the selected route, and dynamically re-assess the selected route during traversal, including evaluating an encountered edge in the route against the assigned two or more attributes.

11. The computer program product of claim 10, wherein the dynamic re-assessment validates passage through the encountered edge.

12. The computer program product of claim 7, wherein dynamically assessing the accessible route includes program code to evaluate at least one of the elements against category criteria assigned to each element.

13. A computer system comprising:
a processing unit operatively coupled to memory;
a tool in communication with the processing unit to dynamically navigate a route, including:

dynamically generate an electronic map having a plurality of elements, the elements include at least four nodes, each node corresponding to a point of interest, and at least three edges, each edge corresponding to a path between any two nodes;

assign two or more attributes to each element, wherein each attribute is associated with a characteristic of the element, the characteristic selected from the group consisting of: a physical characteristic and an accessibility characteristic;

dynamically assess an accessible route for traversal by a navigating entity utilizing the electronic map including;

compare a first assigned attribute of the two or more assigned attributes to one or more first accessibility criteria associated with the navigating entity, each first accessibility criteria associated with a first preference value, the preference value selected from the group consisting of: a rejection of the associated first preference value and a requirement for the associated first preference value;

identify at least four elements as navigable by the navigating entity based on the comparison;

rank each of the identified at least four navigable elements based on a comparison of a second assigned attribute of the two or more assigned attributes to one or more second accessibility criteria associated with the navigating entity, each second accessibility criteria associated with a second preference value, the second preference value is a priority for the associated second accessibility criteria; and     identify at least three of the at least four navigable elements as preferable based on the ranking, the at least three preferable elements including at least two nodes and at least one path; and convert the dynamically assessed accessible route, including the identified at least three preferable elements, into a route selection; and navigate the selected route.

14. The system of claim 13, further comprising the processing unit to calculate a current location during traversal of the selected route, and dynamically re-assess the selected route during traversal, including evaluate an encountered node in the selected route against the assigned two or more attributes.

15. The system of claim 13, further comprising the processing unit to calculate a current location during traversal of the selected route, and dynamically re-assess the selected route during traversal, including evaluate an encountered edge in the route against the assigned two or more attributes.

16. The system of claim 13, wherein assessment of a route includes the processing unit to evaluate at least one of the elements against category criteria assigned to each element.

17. The method of claim 1, wherein the accessibility criteria is related to physical impairment.

* * * * *